(12) United States Patent
Riley et al.

(10) Patent No.: US 7,801,876 B1
(45) Date of Patent: Sep. 21, 2010

(54) SYSTEMS AND METHODS FOR CUSTOMIZING BEHAVIOR OF MULTIPLE SEARCH ENGINES

(75) Inventors: Patrick Riley, Palo Alto, CA (US); Ramanathan Guha, Los Altos, CA (US); Corin Anderson, Mountain View, CA (US); Matthew Wytock, Mountain View, CA (US); Othar Hansson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 429 days.

(21) Appl. No.: 11/972,924

(22) Filed: Jan. 11, 2008

(51) Int. Cl.
*G06F 7/00* (2006.01)
*G06F 17/30* (2006.01)
(52) U.S. Cl. ...................... 707/706; 707/707
(58) Field of Classification Search ............. 707/1, 707/2, 3, 4, 5, 999.003, 999.004
See application file for complete search history.

(56) References Cited

U.S. PATENT DOCUMENTS

2005/0050023 A1* 3/2005 Gosse et al. ............ 707/3
2007/0038600 A1 2/2007 Guha
2007/0038601 A1 2/2007 Guha
2007/0038603 A1 2/2007 Guha
2007/0038614 A1 2/2007 Guha
2007/0038616 A1 2/2007 Guha

* cited by examiner

*Primary Examiner*—Charles Rones
*Assistant Examiner*—Fariborz Khoshnoodi
(74) *Attorney, Agent, or Firm*—Fish & Richardson P.C.

(57) ABSTRACT

The present invention relates to systems and methods for customizing search engine (CSE) behavior. In an embodiment of the present invention, a system customizes a query search of a plurality of search engines. The system includes a search executor configured to receive a search specification having a query modification description, a results modification description, and a specification of sections. The specification of sections includes a first section identifying a first search engine in the plurality of search engines and a second section identifying a second search engine different from the first search engine in the plurality of search engines. The specification of sections also includes a connecting section coupled to the first section and the second section. The connecting section has an associated condition controlling results combined from the first and second sections.

16 Claims, 15 Drawing Sheets

SPECIFICATION 105

- QUERY MODIFICATION DESCRIPTION 202
  (ADD, RESTRICT, PROMOTE, DEMOTE, REMOVE)

- RESULTS MODIFICATION DESCRIPTION 204
  (RESTRICT, PROMOTE, DEMOTE, OR REMOVE)

- UI COMPONENT DESCRIPTION 206
  (UI COMPONENT IDENTIFIER,
  QUERY MODIFICATION DESCRIPTION,
  RESULTS MODIFICATIONS DESCRIPTION)

- SPECIFICATION OF SECTIONS 208

FIG. 2A

```
<SectionedContext>
  <ConcatenationSection>  ←802
    <FirstNApplicableSection section_count="2">  ←804
      <ResultsSection source="web" name="web_results" result_count="5">  ←806
        <RestrictTo>  ←808
          <Query>paper OR papers OR thesis OR research</Query>
        </RestrictTo>
        <Promote>  ←810
          <UrlPattern>*.cmu.edu/*</UrlPattern>
          <UrlPattern>*.stanford.edu/*</UrlPattern>
        </Promote>
      </ResultsSection>
      <ResultsSection source="scholar" name="scholar_results"  ←812
result_count="5">
        <If>  ←814
          <And>
            <Or>
              <QueryContains>academic</QueryContains>
              <QueryContains>professor</QueryContains>
            </Or>
            <Not><QueryContains>school</QueryContains></Not>
          </And>
        </If>
      </ResultsSection>
    </FirstNApplicableSection>
    <RefinementsSection>  ←816
      <Facet>
        <FacetItem title="AI">
          <AddToQuery>artificial intelligence</AddToQuery>
        </FacetItem>
        <FacetItem title="ML">
          <AddToQuery>machine learning</AddToQuery>
        </FacetItem>
      </Facet>
    </RefinementsSection>
  </ConcatenationSection>
</SectionedContext>
```

SYSTEMS AND METHODS FOR CUSTOMIZING BEHAVIOR OF MULTIPLE SEARCH ENGINES

BACKGROUND

1. Field of the Invention

The present invention relates to search technology.

2. Related Art

Computer networks store increasing amounts of information. Users rely on search technology to access information. Users formulate search queries (or simply queries) that may include terms (also called keywords) that identify what information is being sought. Search engines have been developed to receive such search queries and to return ordered results (also called hits) that fulfill the search query. The development of web technology has also helped users access information and search. Users can use browsers to access search engines, to input search queries, and to receive search results. Browsing and searching are now used to help users carry out a variety of transactions, to find information, to navigate information, and to perform other tasks in a variety of applications.

Different types of search engines have been developed to carry out searches. Many search engines (also called general-purpose search engines) are designed to accommodate a large number of users that may carry out a wide range of searches across different types of subject matter located in different web sites. Other search engines (special-purpose search engines) may specialize in searching certain types of content or domains. Users may control which search engines they select; however, control over individual search engine behavior is restricted to proprietors of the search engine only. Users and other third-parties, such as developers, have often faced a take-it-or-leave-it situation with respect to search engine behavior.

Limited attempts have been made to allow users to filter searches. Such attempts have been limited to mere filtering by a browser of returned results to block undesired content (such as, parental web site blocking tools). Different browser tools have also been used to remove undesirable search terms in search queries prior to sending these terms to search engines.

Furthermore, different search engines may return different results. For example, a general web search engine may return results from across the web, whereas an academic different search engine may only return papers or conference proceedings.

Systems and methods are needed that allow a developer to construct a search executor that tailors queries and results from multiple search engines to meet specific needs.

SUMMARY OF THE INVENTION

The present invention relates to systems and methods for customizing search engine (CSE) behavior. In an embodiment of the present invention, a system customizes a query search of a plurality of search engines. The system includes a search executor configured to receive a search specification having a query modification description, a results modification description, and a specification of sections. The specification of sections includes a first section identifying a first search engine in the plurality of search engines and a second section identifying a second search engine different from the first search engine in the plurality of search engines. The specification of sections also includes a connecting section. The connecting section has an associated condition controlling results combined from the first and second sections. The search executor includes a query modifier configured to receive a search query, to generate a first modified query and a second modified query based on the query modification description, and to output the first modified query to the first search engine and the second modified query to the second search engine. The search executor also includes a combiner that combines a first ordered result from the first search engine and a second ordered result from the second search engine based on the associated condition to form combined results. The search executor also includes a result changer configured to generate modified results based on the results modification description and the combined results, and to output the modified results to fulfill the search query.

In another embodiment of the present invention, a method customizes a search of a plurality of search engines. The method includes receiving a search specification having a query modification description, a results modification description, and a specification of sections. The specification of sections includes a first section identifying a first search engine in the plurality of search engines and a second section identifying a second search engine different from the first search engine in the plurality of search engines. The specification of sections also includes a connecting section. The connecting section has an associated condition controlling results combined from the first and second sections. Finally, the method includes: receiving a search query; generating a first modified query and a second modified query based on the query modification description; and outputting the first modified query to the first search engine and the second modified query to the second search engine. The method also includes: receiving a first ordered result from the first search engine and a second ordered result from the second search engine generated based on the first modified query and the second modified query; combining the first ordered result and the second ordered result based on the associated condition to form combined results; generating modified results based on the results modification description and the combined results; and outputting the modified results to fulfill the search query.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 2A shows example content in a search specification according to an embodiment of the present invention.

FIG. 8 contains example XML code that may describe an example specification of sections similar to specification of sections 307.

DETAILED DESCRIPTION OF EMBODIMENTS

The present invention relates to systems and methods for customizing search engine behavior. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This specification may refer to components by number only, as opposed to letter and number. For example, this specification may refer to search engines 120 as opposed to search engines 120A. When a component is described by number only, that description may apply to each component with that number. For example, when search engines 120 is described, that description may apply to each search engine 120A-N.

Customizing Search Engine Behavior

Figure 1A:
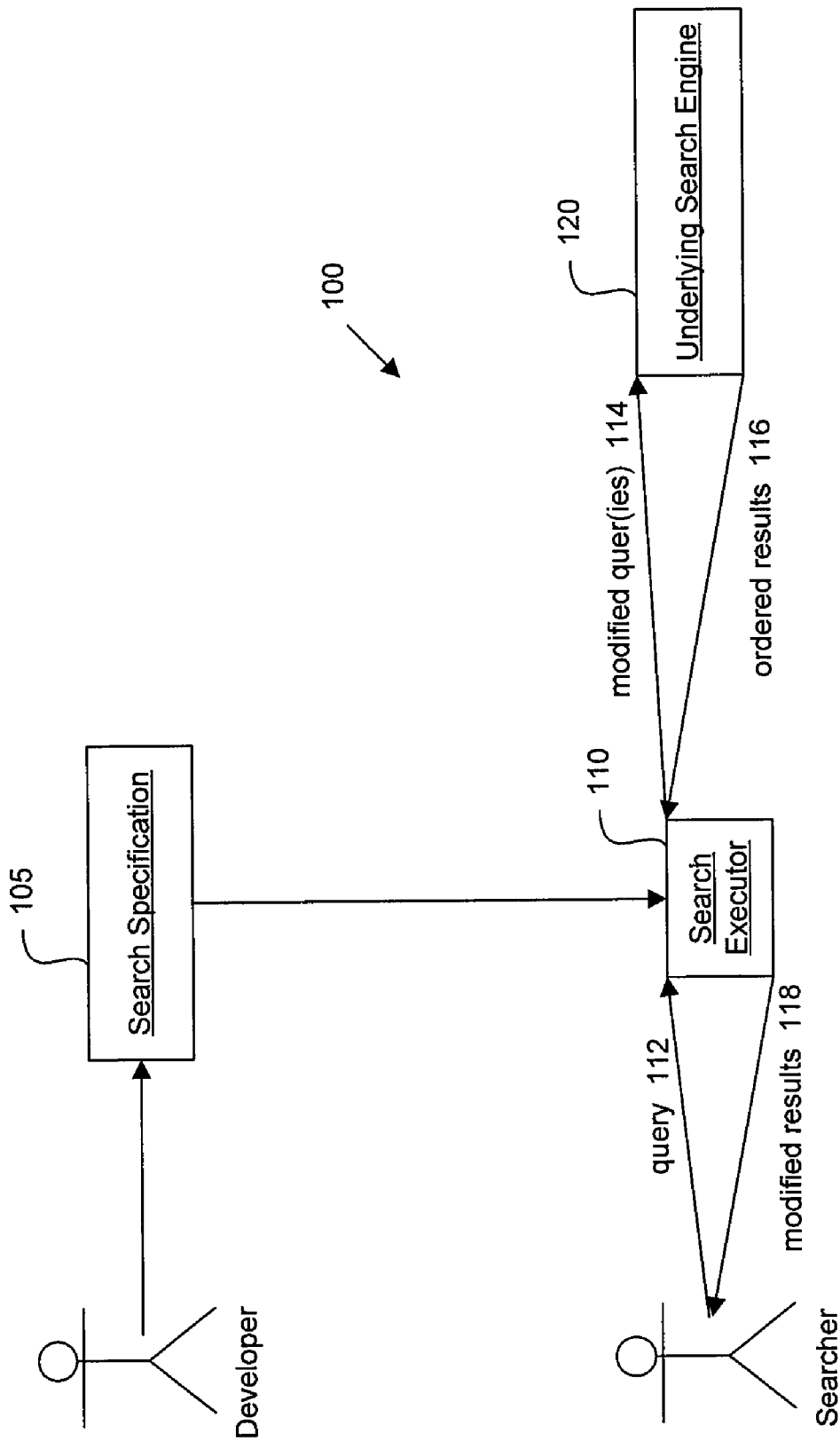
FIG. 1A is a diagram of a system for customizing search engine behavior according to an embodiment of the present invention.

FIG. 1A is a diagram of system 100 for customizing search engine behavior according to an embodiment of the present invention. System 100 includes a search executor 110. Search executor 110 can be coupled to a search engine 120. Search executor 110 can be implemented on any type of processing device or combination of devices, including but not limited to, a computer, workstation, mobile computing device (such as, a PDA, music player, or phone), embedded system, game console, television, set-top box, or other computing device. Search engine 120 (also called underlying search engine 120) can be any type of search engine including, but not limited to, a general-purpose search engine, special purpose search engine, or other type of search engine that performs query-based searches. The term underlying search engine is used interchangeably with search engine and merely helps indicate the presence of a distinct search engine used in the overall system for customizing search engine behavior.

In one example, search executor 110 and underlying search engine 120 operate on different remote computing devices and communicate with one another over one or more networks, including but not limited to, a local area network, medium-area network, and/or wide-area network, such as, the Internet. Alternatively, search executor 110 and underlying search engine 120 can be combined on one device or coupled locally to one another.

Search executor 110 can be implemented in software, firmware, hardware, or any combination thereof. In one example, not intended to limit the present invention, search executor 110 can be implemented as a server that can communicate with or is part of a web server (not shown). In this way, developers or searchers (users) can communicate with search executor 110 remotely over the Web through browsers from remote client devices.

In one embodiment, search executor 110 can receive a search specification 105 from a developer. The term "developer" is used broadly herein to refer to any user that desires to customize search engine behavior. Search specification 105 may have a query modification description and a results modification description. The query modification description includes information on query modification. The results modification description includes information on search results modification. User-interface components can also be specified in search specification 105. Search specification 105 is described further below with respect to an example shown in FIG. 2A.

According to one feature, not intended to limit the invention, search specification 105 can be provided in a language that is hierarchical, human readable/editable and machine-readable/editable for direct execution by a machine. Such a language can include, but is not limited to, XML (eXtensible Mark-up Language).

Figure 1B:
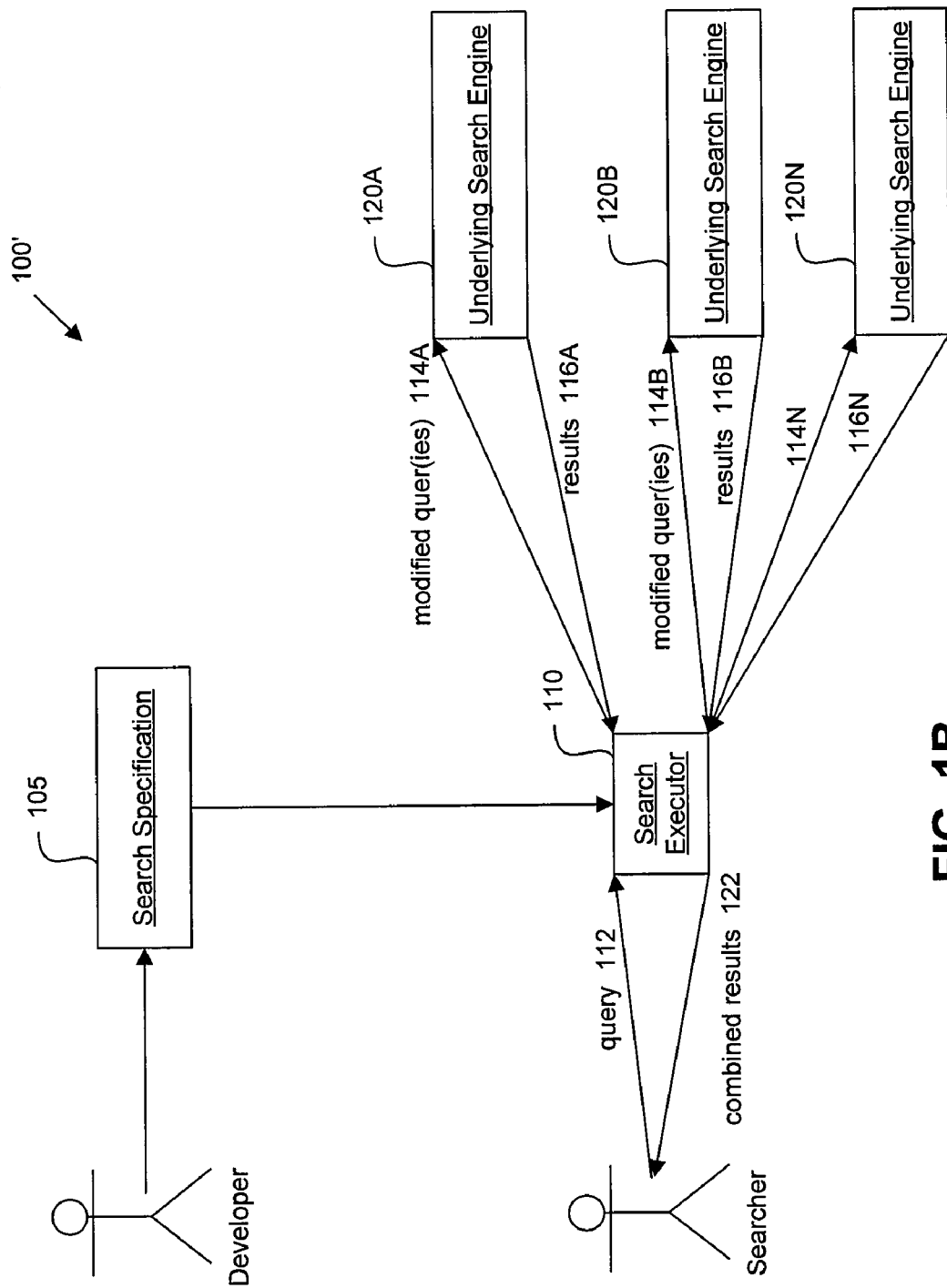
FIG. 1B is a diagram of the system for customizing search engine behavior where the system is coupled to multiple search engines.

FIG. 1B is a diagram of system 100'. System 100' is a system for customizing search engine behavior where the system is coupled to multiple underlying search engines. In system 100', there are multiple underlying search engines 120A through 120N. The search executor may be coupled to all of them. In an alternative arrangement not shown, there may be multiple search executors 110 each coupled to a different underlying search engine 120. Finally, there may be multiple search executors 110 each communicating with multiple underlying search engines 120.

Search Executor Operation

Referring to FIG. 1A, in operation search executor 110 receives a search query 112 from a searcher. The query can be any type of search query including, but not limited to, a query having one or more terms specified by the user for the search. The term "searcher" is used broadly herein to refer to any user that initiates or performs a search.

Search executor 110 generates a modified query 114 based on the query modification description and outputs modified query 114 to search engine 120. Query modification is described in more detail below. Search engine 120 performs a search based on the modified query 114 and returns ordered results 116 (also called hits).

Search executor 110 receives ordered results 116 and generates modified results 118 based on the results modification description present in search specification 105. Search executor 110 then outputs modified results 118 to fulfill the original search query 112.

When there are multiple underlying search engines such as in FIG. 1B, search executor 110 may generate multiple modified queries 114A through 114N. Search executor 110 may send a modified query 114A through 114N to each underlying search engine 120A through 120N. Each modified query 114 may be identical to other modified queries 114, or a modified query 114 may be different from another modified query 114. Each underlying search engine 120A through 120N may respond with corresponding ordered results 116A through 116N. The queries may occur in sequence or in parallel. In order words, search executor 110 may send modified query 114B to underlying search engine 120B prior to receiving ordered results 116A in response to modified query 114A sent earlier to underlying search engine 120A. Once sufficient ordered results have returned, search executor 110 generates combined results 122 based on those ordered results to fulfill query 112. Search executor 110 sends modified results 118 to the searcher.

In this way, a developer can specify a search specification 105 acted upon by search executor 110 to customize search engine behavior of each underlying search engine 120. In a further feature, the developer can specify query modification and results modification independently to customize behavior of the search engine with more power, ease and flexibility than has been previously available to users of search engines or simple browser filter tools alone.

Figure 2B:
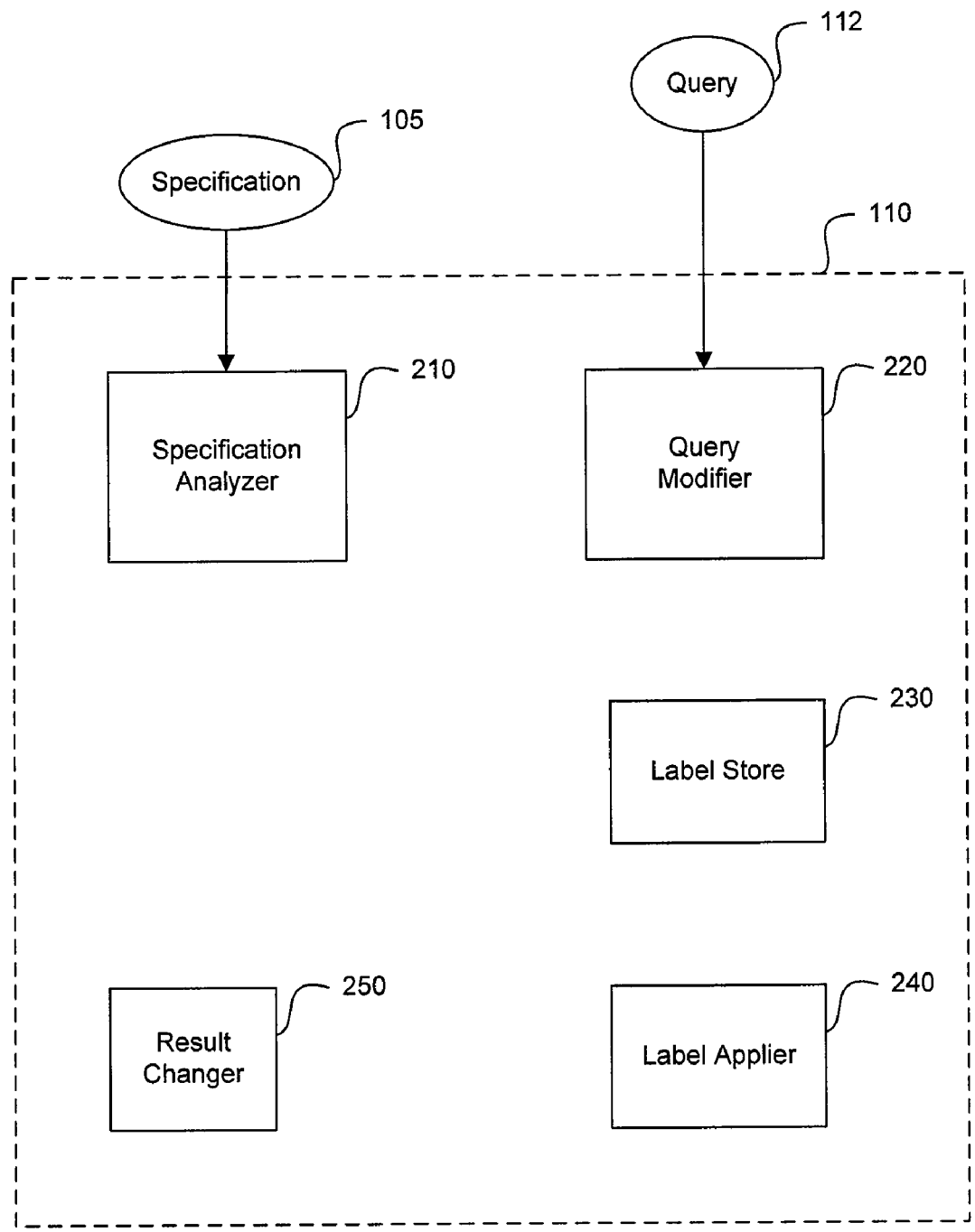
FIG. 2B is a diagram of a search executor according to an embodiment of the present invention.

An example search specification 105 and search executor 110 is described further with respect to FIGS. 2A and 2B respectively. FIG. 2A shows example content in a search specification 105 according to an embodiment of the present invention. In this example, search specification 105 can include one or more of a query modification description 202, a results modification description 204, a user-interface component description 206, or a specification of sections 208.

Query modification description 202 includes information on query modification. For instance, this can include query modification parameters. In one embodiment, query modification (QM) parameters can include one or more parameters to add, to restrict, promote, to demote, or to remove search terms. These QM parameters are described further below with respect to the operation of search executor 110 shown in FIG. 3A.

In another example, query modification description 202 can include information on query modification that is at an even higher-level (such as, an indication of how certain terms or keywords are to be included, excluded, favored, or disfavored to tune search results) which may more easily specified by a developer. This information can then be later analyzed and automatically converted to QM parameters.

Results modification description 204 includes information on results modification of ordered results returned from search engine 120. In particular, this can include results modification parameters. In one embodiment, results modification (RM) parameters can include one or more parameters to restrict, to promote, to demote or to remove results. These RM parameters are described further below with respect to the operation of search executor 110 shown in FIG. 3A.

In another example, results modification description 204 can include information on results modification that is at an even higher-level (such as, an indication of what websites (e.g. URLs) are to be included, excluded, favored, or disfavored in a search to tune search results) which may more easily specified by a developer. This information can then be later analyzed and automatically converted to RM parameters.

User-interface (UI) components description 206 includes information on one or more UI components to be included in a page displaying search results returned to a user. A UI component (such as, a search refinement block) may then be included to allow a user to specify QM parameters and/or RM parameters to allow further customized search. For instance, the UI component description 206 can include markup language defining a UI component that further has an associated query modification description and/or results modification description. One UI component includes a link to a new set of results. The new set of results can be defined with additional QM parameters and/or RM parameters. Example UI components including a query refinement block are described further below.

Specification of sections 208 defines one or more sections and/or one or more connecting sections. Each section may define a respective search engine 120A-N. A connecting section may define an associated condition and an operation. The associated condition determines when results obtained from search engines, referenced in the multiple sections, are to be combined. The operation identifies how results are to be combined and can include, but is not limited to, identifying whether to concatenate, to alternate, or to blend the results. In this way, specification of sections 208 provides a developer with a powerful, flexible way to obtain search results from multiple search engines and to control how such results are combined.

Figure 4:
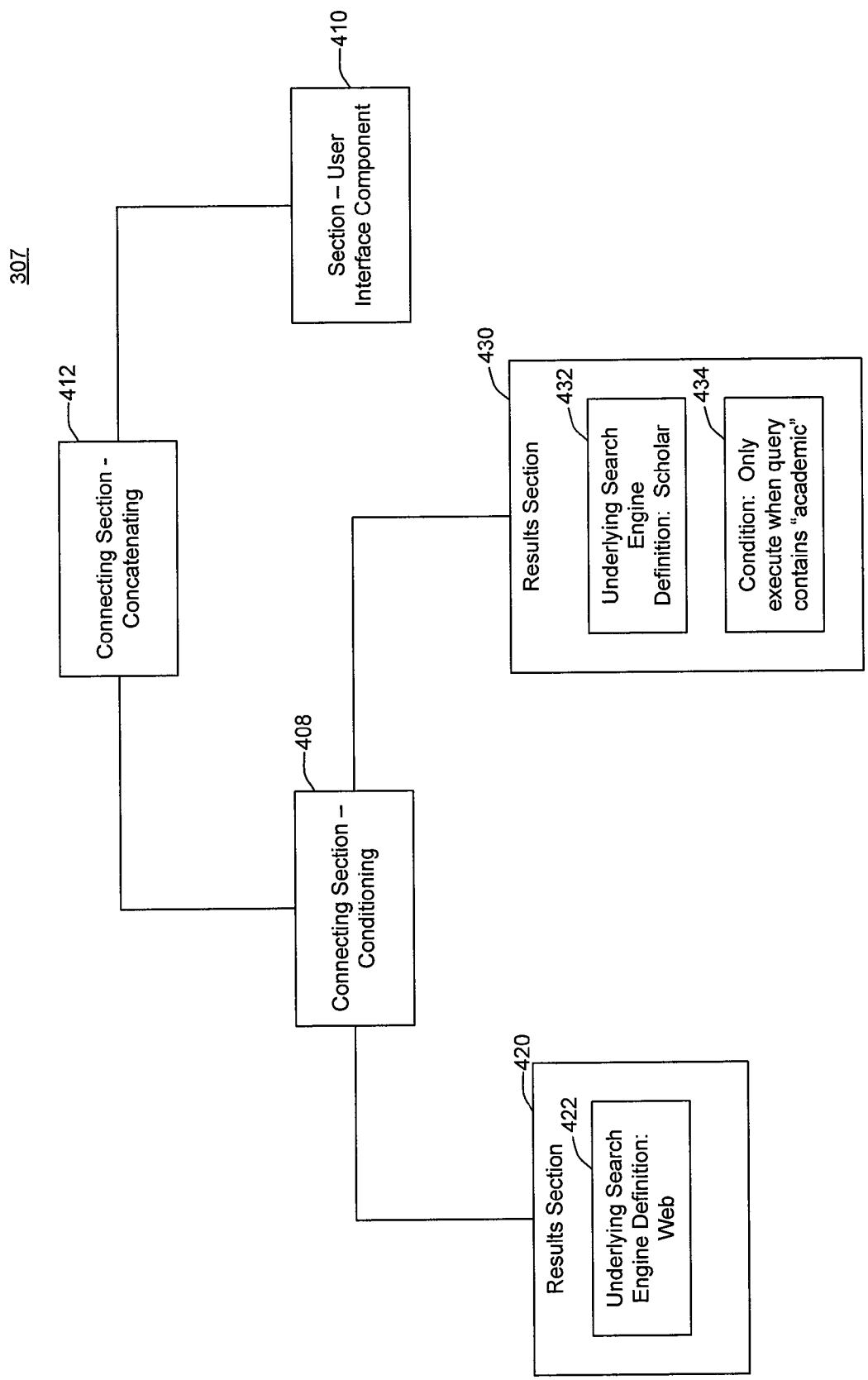
FIG. 4 is a diagram of an example of the specification of sections.

Specification of sections 208 may be structured as a tree, each node being a section. The tree has a root node. The root node may have child nodes. Referring to an example in FIG. 4, a node 412 is a root node and nodes 408 and 410 are child nodes. Those child nodes may be a parent to further child nodes. For example, child node 408 has further child nodes 420 and 430. Nodes without children are leaf nodes, whereas all other nodes are internal nodes. In FIG. 4, nodes 420, 430 and 410 are leaf nodes, and nodes 408 and 412 are internal nodes. Each leaf node could be a section representing a results modification description 204 or a user-interface component description 206. Those leaf nodes are combined by internal nodes called connecting sections. Internal nodes, or connecting sections, may combine any number of leaf nodes. As a corollary to being internal nodes, connecting sections have one or more child sections. In an example, specification of sections 208 may define multiple underlying search engines and combine the results of those search engines based on a condition. Specification of sections 208 is discussed in more detail below with respect to FIG. 4. Connecting sections may also define an operation for controlling how results are combined from searches performed on different search engines according to different sections.

In an embodiment, a developer may author specification of sections 208 such that search executor 110 queries multiple underlying search engines. For example, one search engine may be a general web search engine and another search engine may be an academic search engine that particularly searches academic papers and conference proceedings. A searcher sends query 112 to search executor 110. Search executor 110 then searches both the general search engine and the academic search engine for relevant results. The results are combined, and the searcher receives results from both search engines from a single query. This example is illustrative and is not intended to limit the present invention.

Each of the components, including query modification description 202, results modification description 204, UI component description 206, specification of sections 208 and every section, of specification 105 may be named and re-used.

FIG. 2B is a diagram of search executor 110 shown in further detail according to an embodiment of the present invention. Search executor 110 includes a specification analyzer 210, query modifier 220, label store 230, label applier 240, and result changer 250. Specification analyzer 210, query modifier 220, label store 230, label applier 240, and result changer 250 may be coupled to one another, or more or less connections may be used if desired as would be apparent to a person skilled in the art. Label store 230 can be any type of storage for storing labels including, but not limited to, a memory, database, etc. Search executor 110 and its functional components including the specification analyzer 210, query modifier 220, label applier 240, and result changer 250 can each be implemented in software, firmware, hardware, or any combination thereof. Functionality of search executor 110 is described with respect to different components for the sake of clarity and is not intended to limit the present invention. For example, functionality carried out by search executor 110

(including components specification analyzer 210, query modifier 220, label applier 240, and result changer 250) can be combined into one processing device or module or distributed across different processing devices or modules in different combinations depending upon a particular application, need, or configuration being used.

The operation of the example search executor 110 with at least one underlying search engine 120 will now be described further with respect to FIG. 3A.

Figure 3A:
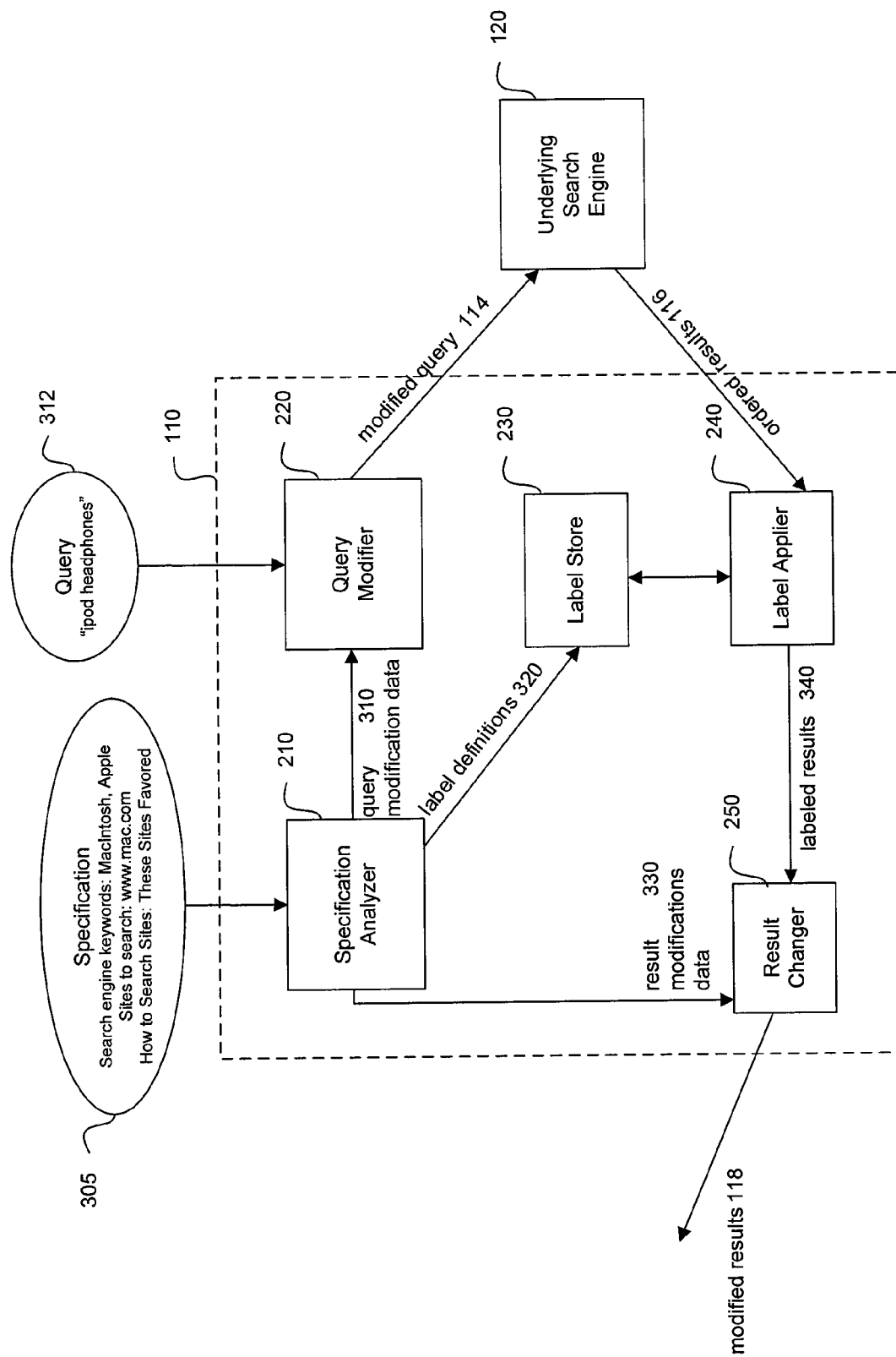
FIG. 3A shows an example of the operation of the search executor of FIG. 2B.

FIG. 3A shows an example of the operation of search executor 110 of FIG. 2B. For clarity, the operation will be described with respect to an example search specification 305 (which adds certain search terms and promotes a certain site to tune search engine behavior) and an example query 312. However, other examples may be used as will be apparent given this description.

Specification 305 includes a query modification description and a results modification description. In particular, specification 305 recites search engine keywords ("Macintosh" and "Apple") intended to tune search engine behavior. Specification 305 also recites sites to search (e.g., a URL "www.mac.com") and how the sites are to be searched ("these sites favored"). An example query 312 consists of the search terms "ipod headphones."

In operation, specification analyzer 210 analyzes search specification 305 and outputs query modification data 310 to query modifier 220. In this example, based on the analysis of search specification 305, specification analyzer 210 may output query modification data 310 made up of QM parameters to add terms "Macintosh" and "Apple." Query modifier 220 receives search query 312 and generates a modified query 114 based on the query modification data 310. In this example, the modified query 114 may include the terms "ipod," "headphones," "Macintosh," and Apple." Modified query 114 is sent to search engine 120. Search engine 120 then returns ordered results 116 that satisfy modified query 114.

Specification analyzer 210 further generates label definitions 320 based on at least one of the query modification description or the results modification description in specification 305 and outputs the label definitions 320 for storage in label store 230. Label applier 240 applies labels to the ordered results 116 received from search engine 120 based on the stored label definitions 320. In this example, label definitions 320 may be a label for www.mac.com. Label applier 240 will then apply label associated with "www.mac.com" for those results within ordered results 116 that are associated with the site "www.mac.com." In one example, URL patterns may be used to facilitate fast labeling. In this case, a label will be applied for those results within ordered results 116 that are associated with the same URL pattern as the site www.mac.com. Labeled results 340 are then sent to results changer 250. The invention is not limited to using URL patterns and other types of pattern languages for document grouping can be used.

Specification analyzer 210 further generates results modification data 330 based on at least one of the query modification description or the results modification description in specification 305 and outputs results modification data 330 to results changer 250. Result changer 250 generates the modified results 118 based on the results modification data 330 received from specification analyzer 210 and outputs modified results 118 to the user to fulfill search query 305. In this example, specification analyzer 210 may generate results modification data 330 made up of a RM command to promote those labeled results 340 having the label associated with www.mac.com. These labeled results may then be moved up in ordering (for instance given a greater weight) within the ordered results to obtain the final modified results 118 sent to a user. The above example is illustrative and not intended to limited the present invention.

Figure 3B:
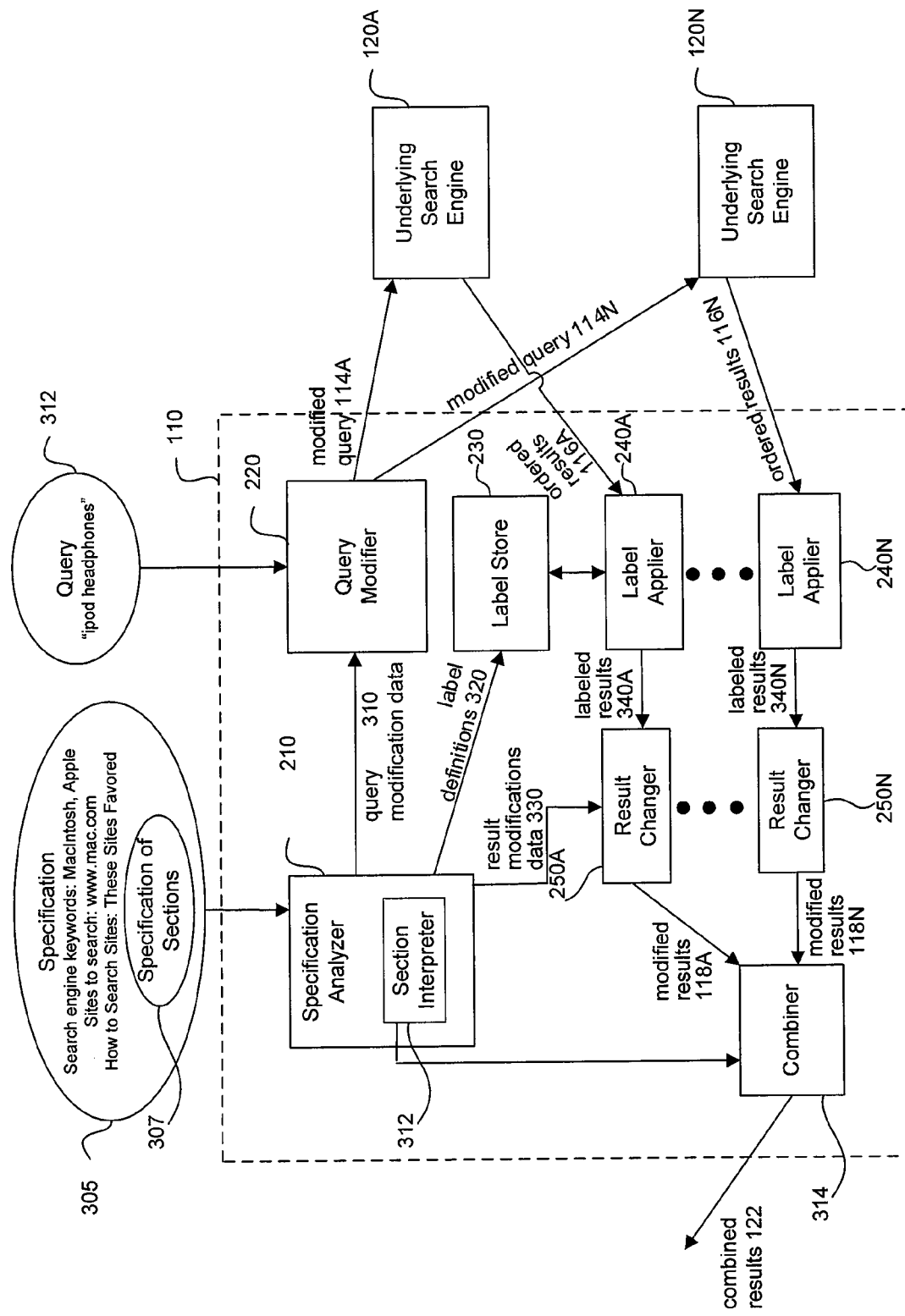
FIG. 3B shows an example of the operation of the search executor where a specification of sections may map to multiple search engines.

FIG. 3B shows an example of the operation of the search executor where there is a specification of sections mapping to multiple underlying search engines. In addition to the elements found in FIG. 3A, FIG. 3B contains a specification of sections 307, a section interpreter 312, and a combiner 314.

Specification of sections 307 is a component of specification 305. Specification of sections 307 defines various sections. The sections could include a results section, user-interface component section, or connecting section (not shown in FIG. 3B). Different results sections may map to different underlying search engines. Sections may be executed. For example, executing a results section may cause the query modifier 220 to send a modified query to underlying search engine 120.

A connecting section has one or more child sections. Also, a section may contain a condition. Either the connecting section or the child sections may include a condition. If the connecting section is a conditional connecting section, the connecting section may use the condition associated with a child section to decide when to execute the child section. An example is discussed further with respect to FIG. 4.

Referring again to FIG. 3B, specification analyzer 210 may contain section interpreter 312. Section interpreter 312 parses specification of sections 307 and determines appropriate actions. Specification analyzer 210 sends the actions to the other components as necessary. For example, suppose the specification of sections contains sections mapping to multiple underlying search engines 120A through 120N. That information is then contained in query modifications data 310. Query modifier 220 then knows to make multiple modified queries 114A through 114N. Those multiple modified queries 114A through 114N may result in multiple ordered results 116A through 116N. This example is illustrative and is not intended to limit the invention.

Ordered results 116A through 116N get returned to label applier 240A through 240N. Each label applier 240A through 240N assigns labels to objects or URLs included in ordered results 116A through 116N, resulting in labeled results 340A through 340N. Each result changer 250A through 250N receives a corresponding labeled result 340A through 340N. Each result changer 250A through 250N modifies a labeled result 340A through 340N based on result modification data 330 as defined in specification 305. Each label applier 240A through 240N and result changer 250A through 250N may add labels and may modify results differently according to specification 305. Combiner 314 combines modified results 118A through 118N according to specification of sections 305. Combiner 314 outputs combined results 122 to fulfill query 312.

Combiner 314 uses connecting sections in specification of sections 307 to combine the results and labels. Connecting sections may have any number of child sections. Based on an operation specified in the connecting section, combiner 314 may concatenate the results from all of the child sections in order, alternate results from each child section, or intersperse or blend results from all child sections using a pre-defined algorithm. These examples are illustrative and do not limit the invention.

As mentioned above, search specification 305 is flexible, and search executor 110 may respond in a number of ways to modify queries and modify ordered results. In addition to the adding of terms described above, query modifier 220 may also restrict or remove one or more search terms in original query 312 to generate the modified query 114. In a further example, query modifier 220 can also promote or demote one or more search terms in the original query 312 to generate the modified query 114. Similarly, in addition to the promoting described above, result changer 250 can restrict, remove, or demote certain labeled results. Other operations and combinations of operations may be performed as would be apparent to a person skilled in the art given this description.

Search specification 305 is also flexible in that specification of sections 307 may combine component sections in a variety of ways using connecting sections. For example, a connecting section includes an operation to concatenate the results from all of the child sections in order, to alternate results from each child section in order, or to intersperse or blend results from all child sections using a pre-defined algorithm. The connecting section may also have an associated condition. The associated condition indicates when to combine the results from different sections. In one example, the condition may indicate to combine the results with those of another section only if the number of results from one section exceeds a certain threshold. In another example, the condition may indicate to combine the results only if the query contains a particular string providing even more flexibility and control to a developer over which results are combined and how they are combined. Each connecting section may also have one or more child sections. These examples are illustrative and do not limit the invention.

Also, in certain cases, search executor 110 may be configured based on likely or actual capabilities of a particular underlying search engine 120. The capabilities of the underlying search engine 120 can then be taken into account when generating modified queries 114 and/or generating modified results 118 (including the defining of labels and changing of the ordered results). One or more of the search executor 110 components including the specification analyzer 210, query modifier 220, label applier 240 and results changer 250, may then may be configured to accommodate capabilities of a particular underlying search engine 120.

For instance, if a search engine 120 supports weighting of search terms, specification analyzer 210 and/or query modifier 220 may then assign weights to terms in the modified query 114 to support promotion or demotion of these terms.

Also, if a search engine 120 returns ordered results with metadata specifying a language type (such as English), then specification analyzer 210 may add an "English" label definition and results changer 250 may restrict label results to pass only English labeled results.

See also, further examples of query modification, results modification, and UI components specified in a search specification set forth below.

Example Specification of Sections

FIG. 4 is a diagram of the example specification of sections 307. This is an example and not intended to limit the invention. Specification of sections 307 is structured as a tree with a root node and child nodes. The root node is concatenating connecting section 412. Concatenating connecting section 412 has two child nodes: conditioning connecting section 408 and user interface component section 410. This is an example. In practice, each connecting section may have any number of child nodes. Conditioning connecting section 408 also has two child nodes: results section 420 and results section 430. Both results section 420 and results section 430 map to underlying search engines. In this example, results section 420 maps to a search engine called "web" at block 422. Results section 430 maps to a search engine called "scholar" at block 432. Results section 430 also contains a condition at block 434. The condition instructs conditioning connecting section 408 to execute only results section 430 when the query contains the word "academic".

In an example operation with specification of sections 307, a query "academic papers" may come in. In generating the results page, search executor 110 looks to conditioning connecting section 408. Because section 408 is a conditioning conditional connecting section, section 408 evaluates the condition of any child sections to determine whether to execute that child section. Section 408 has a child section 430 containing a condition.

Section 430's condition is to execute only when the query contains the word academic. Here, the query does contain the word "academic", so the section 430 is executed. To execute section 430, search executor 110 sends the modified query 114A to the underlying search engine defined by "scholar." This will return ordered results 116A.

As section 420 does not have a condition, it is also executed. To execute section 420, search executor 110 sends the modified query 114N to the underlying search engine defined by "scholar." This will return ordered results 116N.

Combiner 314 combines ordered results 116A and ordered results 116B. This may be done by concatenating the results, blending the results, alternating the results, or other ways of combining results as defined by section 408.

Section 410 is a section defining a user interface component. As an example, the user interfaces component may be a set of links.

Finally, connection section 412 includes an operation to concatenate the results of section 408 and section 410. Again, this is merely exemplary. In practice, each connecting section may have one or more children to concatenate. Together, they form modified results 118 outputted by the search executor.

For example, a developer may author specification of sections 307. Specification of sections 307 specifies that search executor 110 queries multiple underlying search engines: a search engine defined by "web" and a search engine defined by "scholar". The search engine defined by "web" may be, for example, a general web search engine. The search engine defined by "scholar" may be, for example, an academic search engine that particularly searches academic papers and conference proceedings. In this example, a searcher sends query 112 to search executor 110. Search executor 110 then searches both the "web" search engine, and the "scholar" search engine for relevant results. The results are combined, and the searcher receives results from both search engines from a single query. This example is illustrative and is not intended to limit the present invention.

Method of Customizing Search Engine Behavior

Figure 5A:
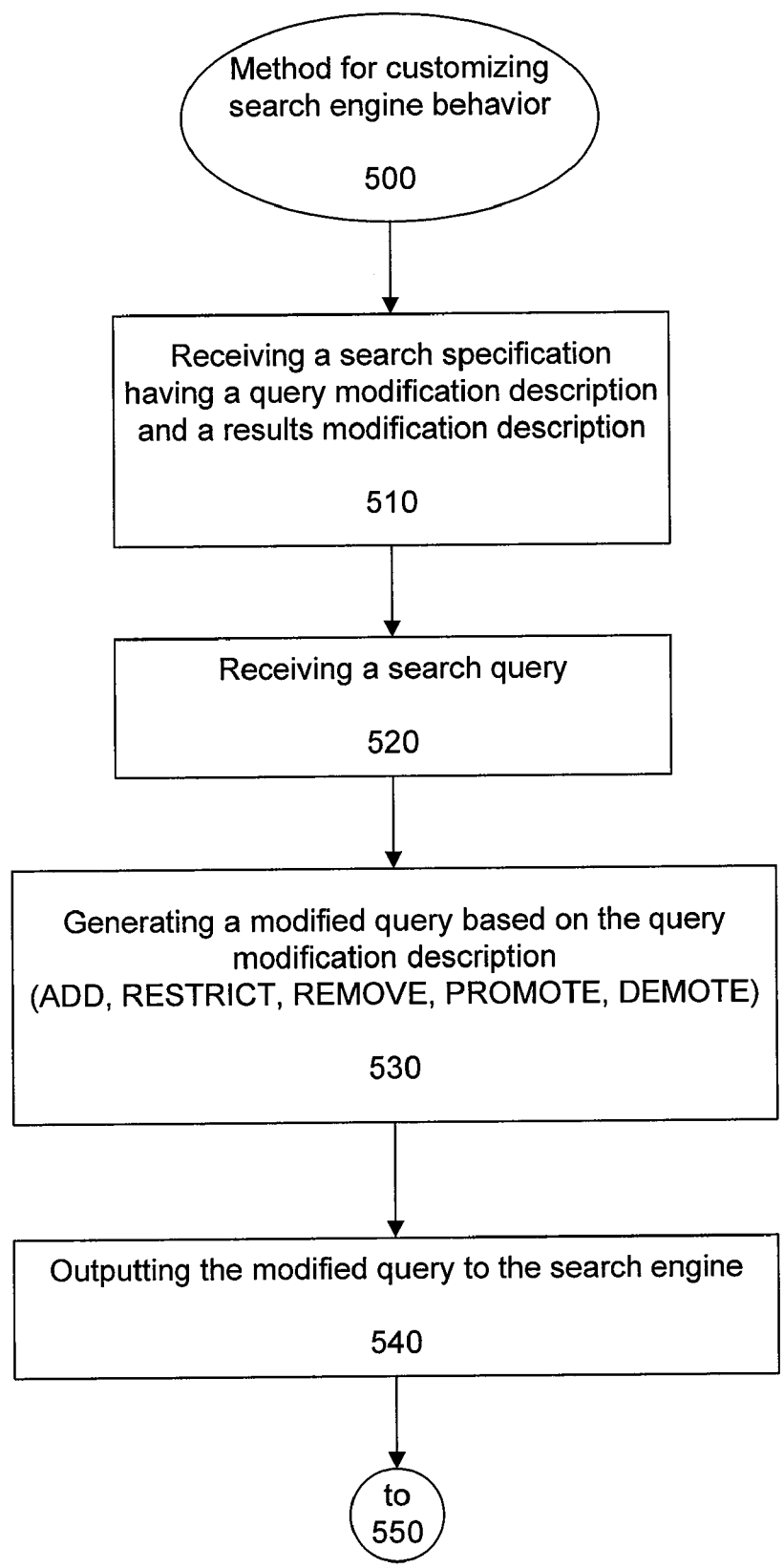
FIGS. 5A, 5B and 5C are flowchart diagrams illustrating a method of customizing search engine behavior according to an embodiment of the present invention.
Figure 5B:
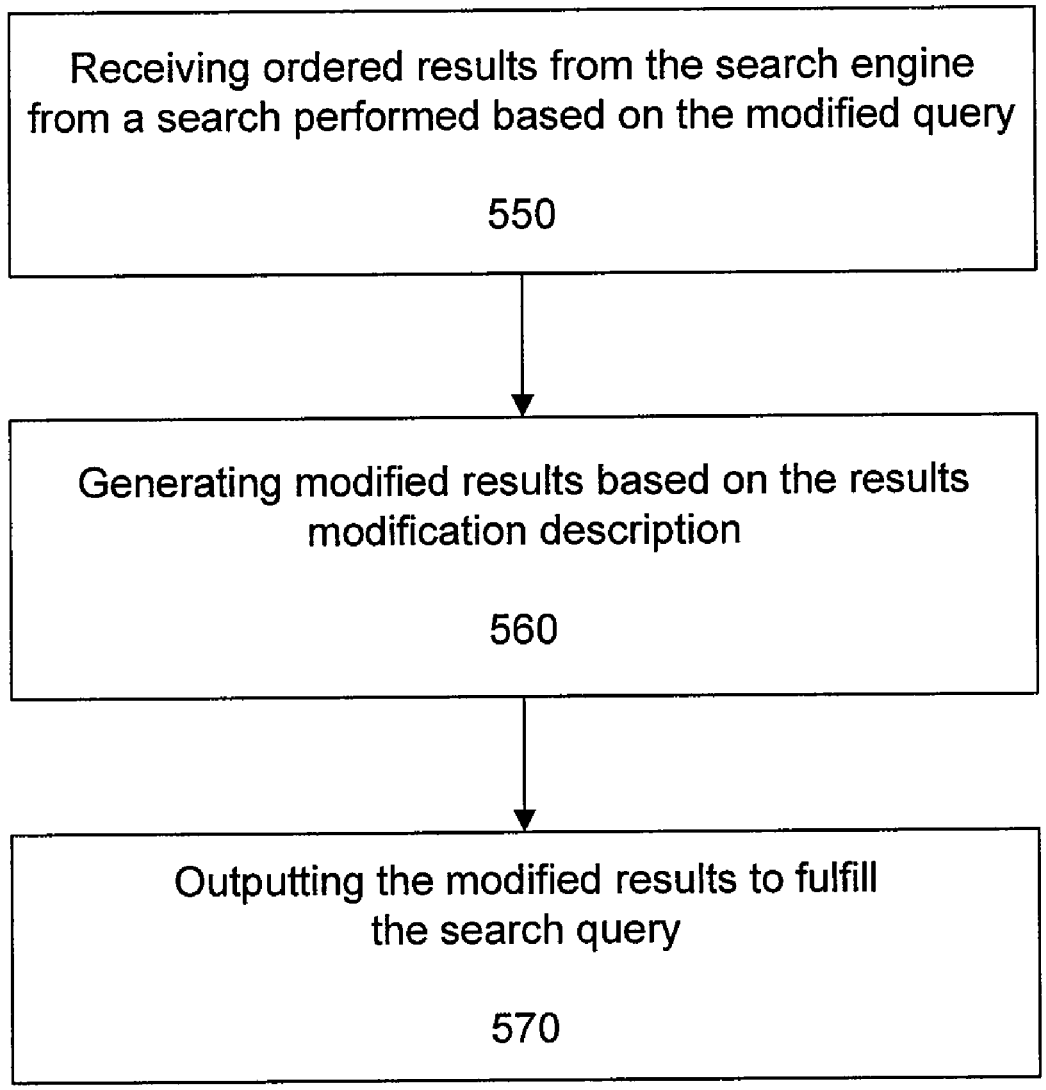
Figure 5C:
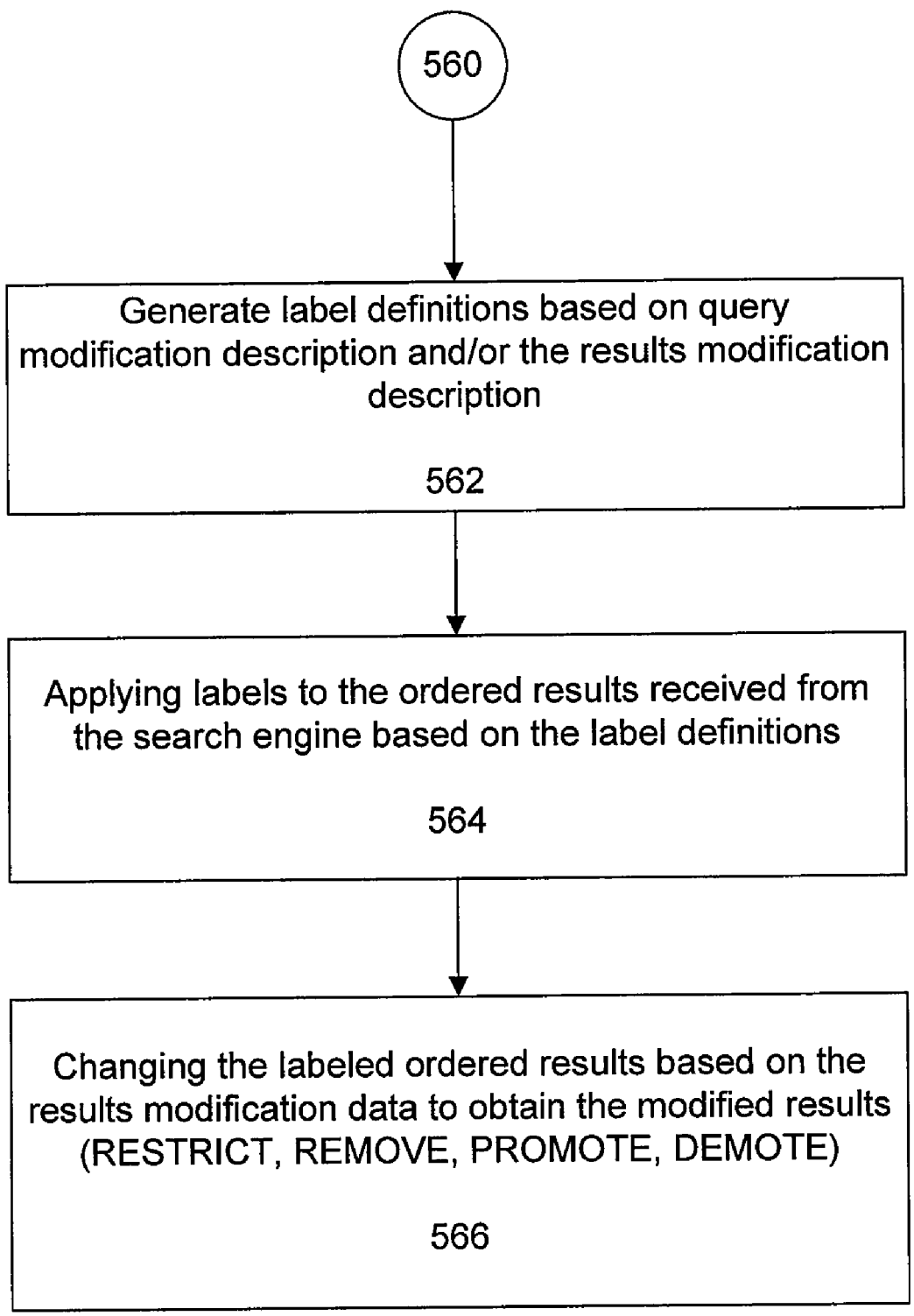

FIGS. 5A, 5B and 5C are flowchart diagrams illustrating a method of customizing search engine behavior 500 according to an embodiment of the present invention. For brevity, method 500 will be described with respect to system 100 but is not intended to be necessarily limited to the structure of system 100 or it components. As shown in FIG. 5A, method 500 includes receiving a search specification 105 having a query modification description and a results modification description (step 510), and receiving a search query (step 520). User-interface components can also be specified in search specification 105 in step 510. Further steps include generating a modified query based on the query modification description (step 530) and outputting the modified query to a search engine (step 540). In an example, the modified query generating step 530 can further comprise at least one of adding, restricting, or removing one or more search terms in the original query to generate the modified query. In a further example, the modified query generating step 530 can further comprise at least one of promoting or demoting one or more search terms in the original query to generate the modified query.

Control then proceeds to step 550 as shown in FIG. 5B. Method 500 then includes receiving ordered results from a search engine 120 from a search performed based on the modified query (step 550), generating modified results based on the results modification description (step 560), and outputting the modified results to fulfill the search query (step 570). In this way, a developer of a search specification 105 can customize search based on query modification and results modification. In one example, steps 510-570 are carried out by a search executor 110.

As shown in FIG. 5C, step 560 can further include steps of generating label definitions based on at least one of the query modification description or the results modification description (step 562), applying labels to the ordered results received from the search engine based on the label definitions (step 564), and changing the labeled ordered results based on the results modification data to obtain the modified results (step 566). In one example, the result changing can comprise restricting or removing labeled results to obtain the modified results. In a further example, the result changing can comprise promoting or demoting labeled results to obtain the modified results.

Method 500 can further include enabling a developer to define or edit the query modification and the results modification descriptions in the search specification to customize the behavior of the search engine which is apparent to a user. Such enabling may allow a developer to define or to edit the query modification and the results modification descriptions independent of one another.

Figure 6A:
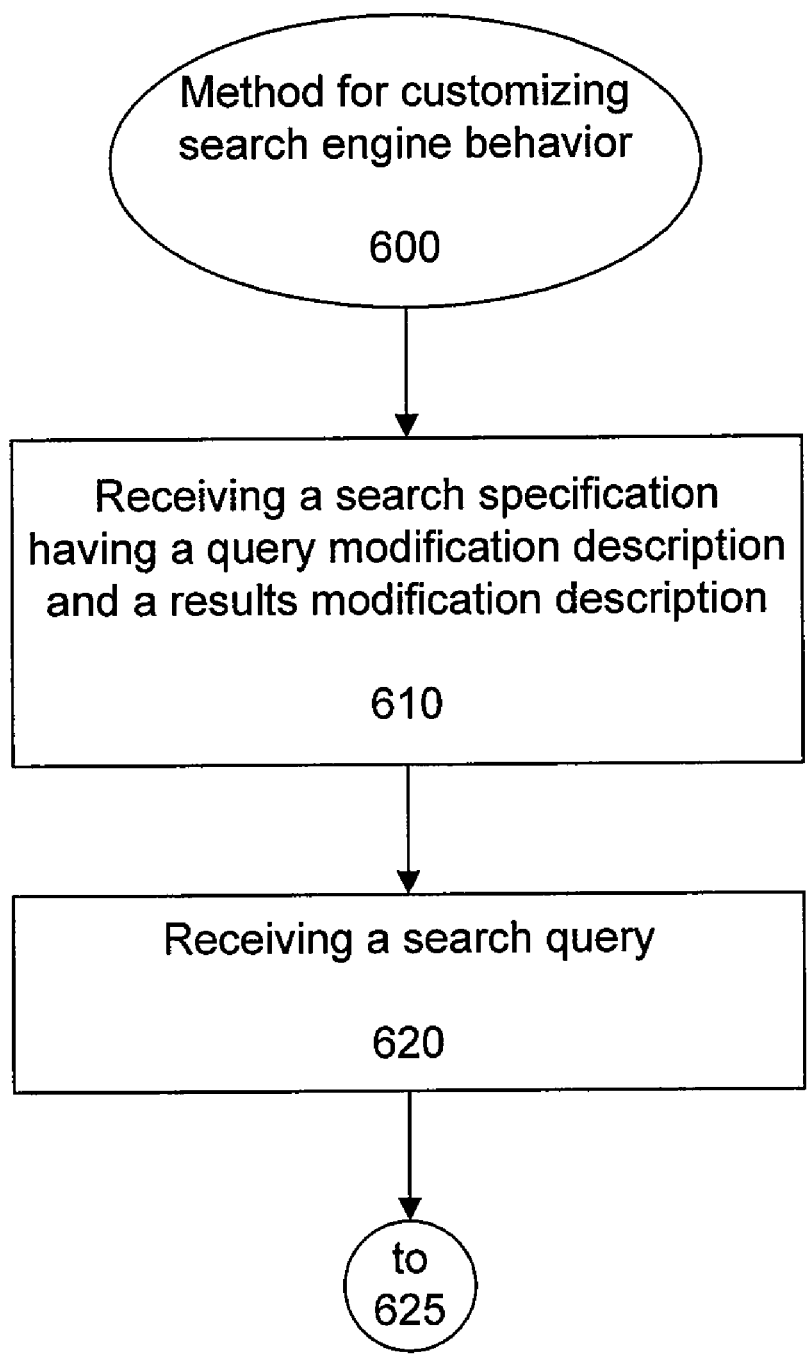
FIGS. 6A, 6B and 6C show a method of customizing search engine behavior with multiple search engines.
Figure 6B:
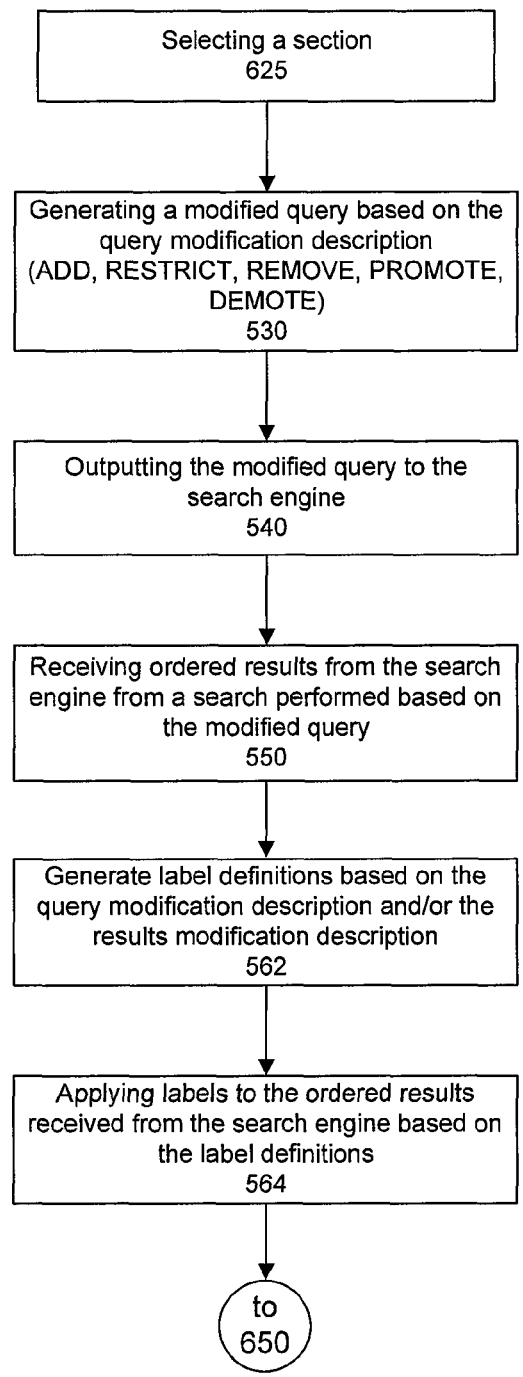
Figure 6C:
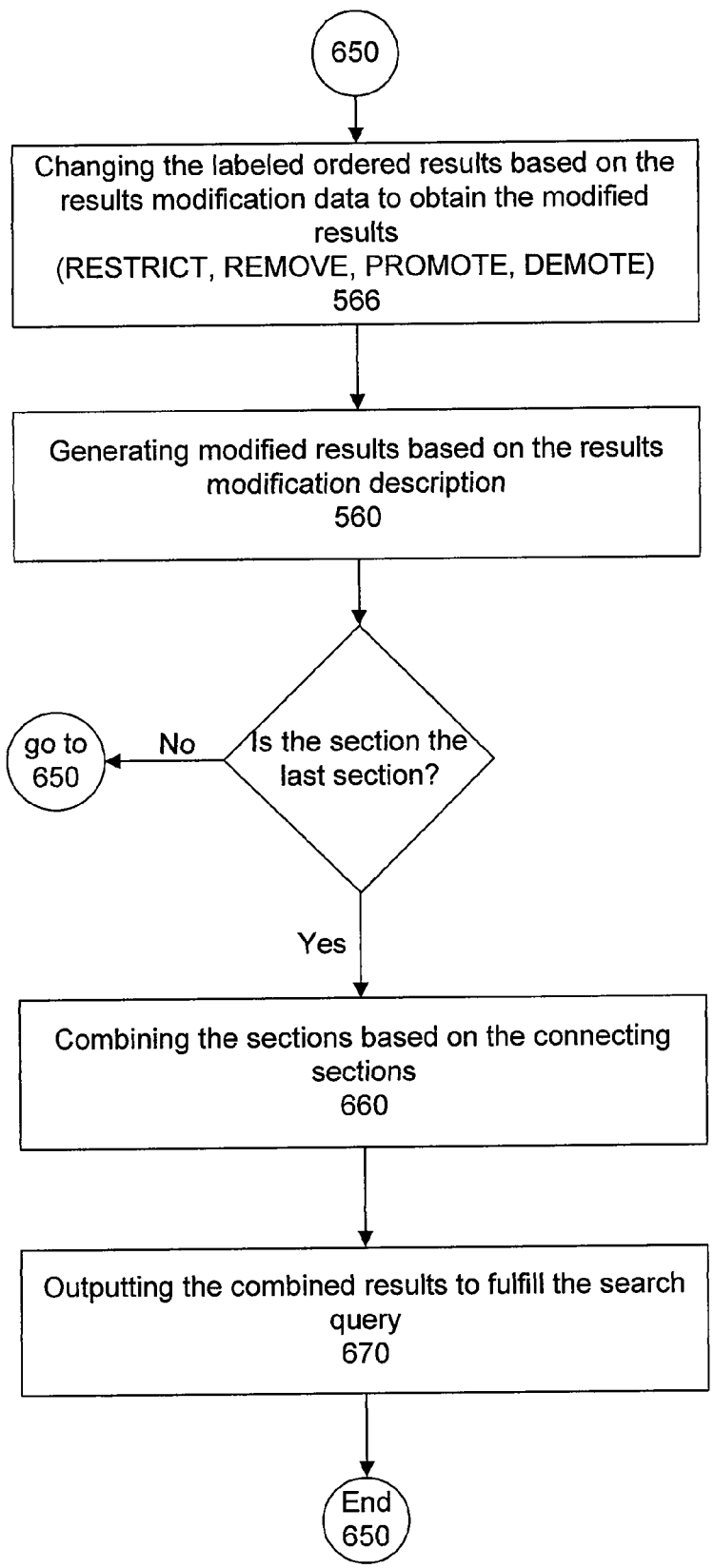

Method of Customizing Search Engine Behavior with Multiple Underlying Search Engines FIGS. 6A, 6B and 6C are flowchart diagrams illustrating a method 600 for customizing search engine behavior with multiple underlying search engines. For brevity, method 500 will be described with respect to system 100' but is not intended to be necessarily limited to the structure of system 100' or it components.

Method 600 differs from method 500 in that it starts with receiving a search specification having a query modification description, a results modification description, and a specification of sections at step 610. At step 620, search executor 110 receives a search query.

FIG. 6B shows a loop with a sequence of steps that must be executed for each section. Although the diagram shows the method as an iterative loop, each section may be processed recursively, independently or in parallel. The method begins by selecting a section at 625. For each section, method 600 generates a modified query based on the query modification description (step 530), outputs the modified query to a search engine (step 540), receives ordered results from a search engine 120 from a search performed based on the modified query (step 550), generates label definitions based on at least one of the query modification description or the results modification description (step 562) and applies labels to the ordered results received from the search engine based on the label definitions (step 564). Continuing to 650 in FIG. 6C, the method changes the labeled ordered results based on the results modification data to obtain the modified results (step 566) and generates modified results based on the results modification description (step 560). If the section is not the last section, control returns to step 635 and the steps are repeated for another section.

Once the modified results have been determined for all the sections, the method combines the sections based on the connecting sections (step 660) and outputs the combined results to fulfill the search query (step 570). The connecting sections may include a condition (and operation) for controlling results combined from multiple search engines identified by multiple sections. The combining in step 660 can include executing (or interrupting) a specification of sections like specification of sections 307 described above. Each modified query may be identical to each other, or a modified query may be different from other modified queries.

In another embodiment a section may be processed by the method only if a condition is met.

After iterating through the sections, control proceeds to step 660. As shown in FIG. 6C, at step 660 the sections are combined according to the connecting sections. Each connecting section may combine one or more sections.

Iterating through the loop inside method 600 allows search executor 110 to query multiple search engines for a single query from a searcher. The multiple search engines each return results. The results are combined, and the searcher recieves results from both search engines from a single query. This saves the searcher time, provides more comprehensive search results and makes looking for information easier.

In a further feature, combining sections based on the connecting sections in step 660 provides even further flexibility and control over the combination of results. A connecting section may allow a developer to define sections, conditions for when sections are to be combined, (that is, when results from search engines identified in the sections are to be combined), and an operation controlling how the results are combined (e.g., concatenate, alternate, blend, or other combining).

Example Web-Based CSE Creator and Host

Figure 7:
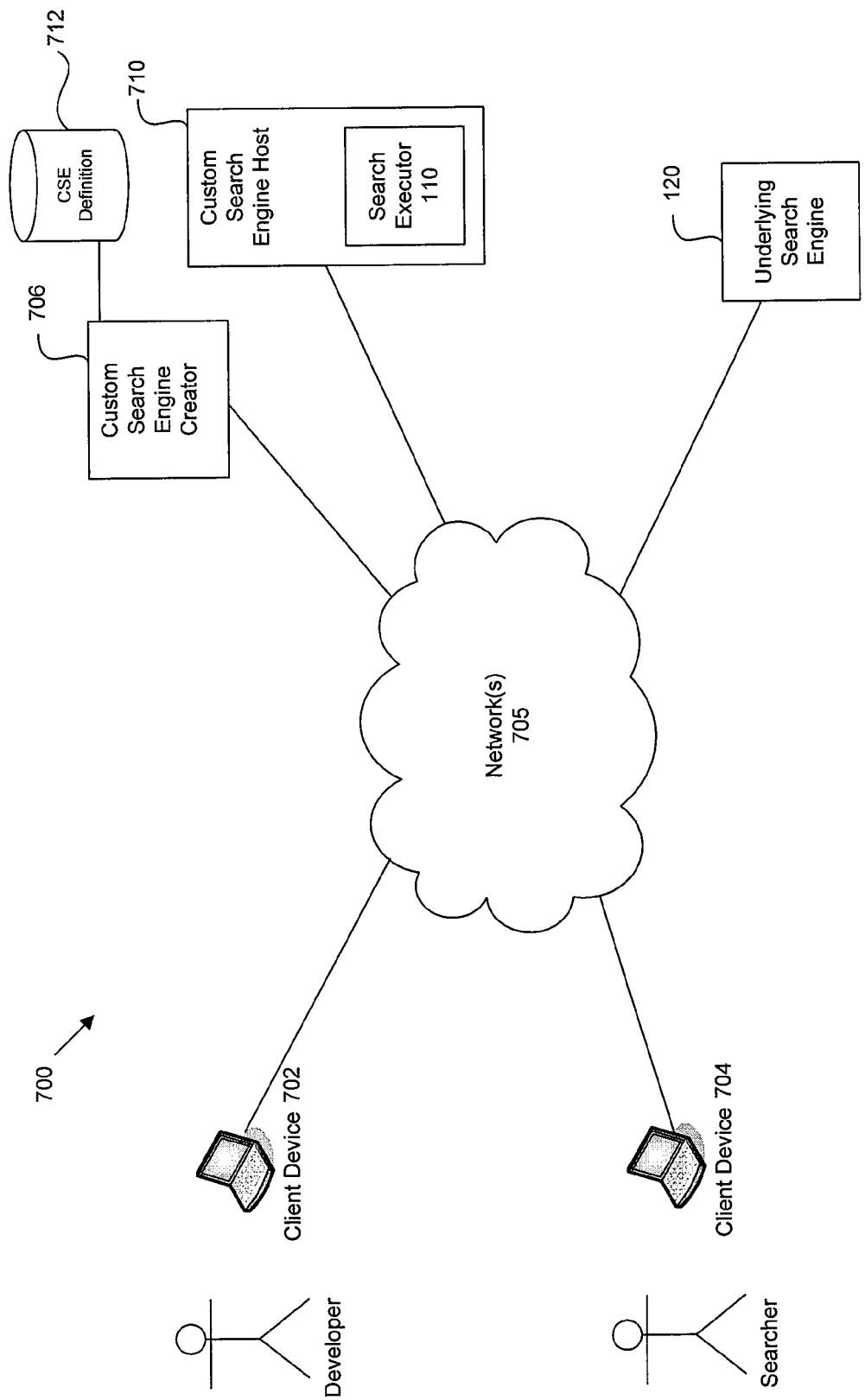
FIG. 7 illustrates a computer network system that can host a search executor and support custom engine creation over the World Wide Web according to another embodiment of the present invention.

FIG. 7 illustrates a computer network system 700 that can host a search executor 110 and support custom engine creation over the World Wide Web according to another embodiment of the present invention. System 700 includes a custom search engine creator 706 and a custom search engine host 710 coupled to one another over one or more computer network(s) 705.

Network 705 may be any network or combination of networks that can carry data communication. Such network 705 can include, but is not limited to, a local area network, medium area network, and/or wide area network, such as the Internet. Network 705 can support protocols and technology including, but not limited to, World Wide Web protocols and/or services. Intermediate web servers, gateways, or other servers may be provided between components of system 700 depending upon a particular application or environment.

Clients devices 702, 704 and at least one underlying search engine 120 can also be coupled over network 705. Clients devices 702, 704 can be any type of client device including, but not limited to, a computer, workstation, mobile computing device (such as, a PDA, music player, or phone), embedded system, game console, television, set-top box, or other computing device. Custom search engine creator 706 and a custom search engine host 710 can each be servers running on any type of processing device. One or more web servers (not shown) can also be included to support web protocols and communication.

Custom search engine creator 706 can support creation of different custom search engines over the Web for developers at one or more client devices 702. For example, custom search engine creator 706 can allow a developer to create a custom search engine by specifying a name. Custom search engine creator 706 can then serve one or more forms or other queries to a developer to allow the developer to define a search specification 105. For example, a content document, such as, an HTML form may be served to a developer for display on a browser at client device 702. The HTML form may include fields to enter any one or more of basic information (search engine name and search engine description), keywords (e.g., terms used to describe the content or subject of the customized search engine), a desired search engine language type, sites to search (a list of one or more sites to search), and how to search (search only these sites, favor or demote these sites, or restrict or remove these sites). User-interface components can also be specified in search specification 105. Once the user enters necessary data into client device 702, the data may be sent to custom search engine creator as, for example, Hypertext Transfer Protocol (HTTP) parameters in an HTTP request. Custom search engine (CSE) creator 706 may store the data as a CSE definition 712. CSE definition 712 may include a search specification.

Custom search engine host 710 hosts one or more search executors 110. A search specification 105 having query modification description 202, results modification description 204, UI component description 206, and/or specification of sections 208 can be created based on the input from a developer at client device 702 and sent or accessed by a search executor 110. Search executor 110 then operates as described above to customize the behavior of underlying search engine 120 that is apparent to a user performing a search query at client device 704.

Further Example Query, Results and UI Modifications

This is a further discussion of example modifications that can be specified in a search specification 105 in XML to modify the results from an underlying search engine or document corpus. This example is illustrative and not intended to limit the present invention. Each section in the specification of sections may be named and reused.

Query Modification

A simple sort of query modification says to always add terms to the original query. There may be several different ways to specify this, such as <Keywords>term1 term2</Keywords>

<RestrictTo><Query>term1 OR term2</Query></RestrictTo>

<Promote weight="0.5"><Query>term1 term2</Query></Promote>

<Remove><Query>badterm</Query></Remove>

The expressiveness of a query can be limited by the expressiveness of the queries of the underlying search engine. However, one can imagine that at least the following operations would generally to be supported in a search engine 120:

Returning only objects that match the given terms,

Promoting objects that better match the given term,

Demoting objects that better match the given term, and

Removing any object which matches the given terms.

A more complicated form of query modification is rewriting a term in the user query. This includes adding additional terms at the location of the original, such as synonyms <Synonym><OriginalTerm>AAAI</OriginalTerm><NewTerm>American Association of Artificial Intelligence</NewTerm></Synonym>

Results Modification

Similar to the query modification, a user can specify how a given set of objects should be changed in the original results set. Consider the example of naming ordered results by URL patterns. Search executor 110 can then support the following operations:

Returning only objects with URLs in the set,

Promote objects with URLs in the set,

Demote objects with URLs in the set, and

Remove objects with URLs in the set.

Using Conjunctive Normal Form

Search specification 105 can include a number of Query Modifications and Results Modification instructions. Search executor 110 can accept a conjunctive normal form for specifications. Search executor 110 can accept a series of modification instructions and apply an AND of them; that is, apply all of those instructions. Using conjunctive normal form is merely an example. In practice, a disjunctive form or other forms may be used. Each instruction implicitly contains an OR in indicating the modifications to make.

For example, in a Query Modification

<RestrictTo>
   <Query>fish</Query>
   <Query>bass</Query>
</RestrictTo> says to restrict to only those documents when contain the word "fish" or the word "bass."

Similarly

<Promote>
   <UrlPattern>*.google.com/*</UrlPattern>
   <UrlPattern>*.yahoo.com/*</UrlPattern>
</Promote> says to promote a page if it is from google.com or from yahoo.com.

On the other hand,

<RestrictTo>
   <Query>fish</Query>
</RestrictTo>
<Remove>
   <UrlPattern>*.google.com/*</UrlPattern>
</Remove>

Says to only return documents that contain the word fish and remove any result with a URL from google.com.

Further, search executor 110 can allow a group of URL patterns to be named as a "label". The association of a label with a URL pattern is known as an annotation.

<Annotations>
   <AddLabel name="good_universities">
   <UrlPattern>*.cmu.edu/*</UrlPattern>
   <UrlPattern>*.stanford.edu/*</UrlPattern>
   </AddLabel>
</Annotations>

This defines the label "good_universities" to be an or of the patterns specified. Labels can then be used anywhere where url patterns are allowed.

User Interface Components

A user can also be able to specify new user interface components. Some components may need to specify to issue a modified query, adding or removing terms and other query parameters. Here is one example of such an interface component, a faceted query refinement block.

```
<Facet title="Information type">
   <FacetItem title="News">
   <AddToQuery>news</AddToQuery>
   </FacetItem>
   <FacetItem title="Reviews">
   <AddToQuery>reviews</AddToQuery>
   </FacetItem>
</Facet>
<Facet title="Quality">
   <FacetItem title="Good">
   <AddToQuery>more:good</AddToQuery>
   </FacetItem>
   <FacetItem title="Bad">
   <AddToQuery>more:bad</AddToQuery>
   </FacetItem>
</Facet>
``` may be rendered something like

Information Type
  News
  Reviews

Quality
  Good
  Bad where each of "News", "Reviews", "Good", "Bad" are hyperlinks to new searches.

Another possible user interface component would be to display the contents of a given location (such as a picture or a web page) inline.

Specification of Sections

A user may also be able to specify sections. FIG. 8 contains an example section of XML code 800 that may describe a specification of sections similar to specification of sections 307.

As an example, a concatenating connecting section is at the root of the tree. The concatenating section is represented by the tag at 802. The concatenating section has two children: a conditioning section and a refinements section. This example is illustrative. In practice, there may be one or more children of a connecting section such as a concatenating section. The refinements section is a user interface component section and is represented by the tag at 816. The refinements section contains a facet.

The conditioning section is represented by the tag "FirstNApplicableSection" at 804. The conditioning section has two child sections: a first results sections and a second results section. The first results section is represented by the tag at 806. The first results section maps to an underlying search engine defined as "web". This is shown by the attribute "source='webm'". The first results sections contains a query modification description and a results modification description. The query modification description is represented by the tag "RestrictTo" at 808. The results description modification is represented by the tag "Promote" at 810.

The second results section is represented by the tag at 812. The second results section maps to an underlying search engine defined as "scholar", as shown by the attribute "source='scholar'". The second results section contains a condition at 814. The condition executes the query only if the query contains the words "academic" or "professor", and not "school".

CONCLUSION

Exemplary embodiments of the present invention have been presented. The invention is not limited to these examples. These examples are presented herein for purposes of illustration and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A system for customizing a query search of a plurality of search engines, comprising:
   a processor;
   a search executor configured to receive a search specification having a query modification description, a results modification description, and a specification of sections,
   wherein the specification of sections includes a first section identifying a first search engine in the plurality of search engines and a second section identifying a second search engine different from the first search engine in the plurality of search engines,
   wherein the specification of sections includes a connecting section coupled to the first section and the second section, the connecting section having an associated condition controlling results combined from the first and second sections,
   the search executor comprising:
   a query modifier configured to receive a search query, to generate a first modified query and a second modified query based on the query modification description, and to output the first modified query to the first search engine and the second modified query to the second search engine;
   a combiner that combines a first ordered result from the first search engine and a second ordered result from the second search engine based on the associated condition to form combined results; and
   a result changer configured to generate modified results based on the results modification description and the combined results, and to output the modified results to fulfill the search query.

2. The system of claim 1, wherein the connecting section further includes an operation identifying whether to concatenate, to alternate, or to blend the first and second ordered results, and the combiner combines the first ordered result and the second ordered result according to the connecting section operation.

3. The system of claim 1, wherein the results modification description includes at least one of the following results modification parameters: restrict, promote, demote, or remove.

4. The system of claim 1, wherein the search specification further includes a user interface component description.

5. The system of claim 4, wherein the user interface (UI) component description includes a UI component identifier, and wherein the query modification description and the results modification description are associated with the identified UI component.

6. The system of claim 4, wherein the user interface (UI) component description includes a UI component identifier and at least one of an additional query modification description or an additional results modification description associated with the identified UI component.

7. The system of claim 1, wherein the search specification is defined or edited based on input by a developer.

8. The system of claim 1, wherein the search executor further comprises:
a specification analyzer; and
a query modifier, coupled to the specification analyzer;
wherein the specification analyzer analyzes the search specification and outputs query modification data to the query modifier, and the query modifier receives the search query, generates the modified query based on the query modification data and outputs the modified query to the plurality of search engines, and
wherein the query modifier adds, restricts, promotes, demotes, or removes one or more search terms in the original query to generate the modified query.

9. The system of claim 8, wherein the search executor further comprises:
a label applier;
a label store coupled to the specification analyzer and the label applier; and
a result changer coupled to the label applier;
wherein the specification analyzer further generates label definitions based on at least one of the query modification description or the results modification description and outputs the label definitions for storage in the label store,
wherein the label applier applies labels to the ordered results received from the plurality of search engines based on the label definitions and outputs labeled ordered results to the result changer, and
wherein the result changer generates the modified results based on the results modification data received from the specification analyzer and outputs the modified results to fulfill the search query, whereby, a developer of the search specification customizes the search based on query modification and results modification.

10. A method for customizing a search of a plurality of search engines, comprising:
(a) receiving a search specification having a query modification description, a results modification description, and a specification of sections,
wherein the specification of sections includes a first section identifying a first search engine in the plurality of search engines and a second section identifying a second search engine different from the first search engine in the plurality of search engines,
wherein the specification of sections includes a connecting section coupled to the first section and the second section, the connecting section having an associated condition controlling results combined from the first and second sections;
(b) receiving a search query;
(c) generating a first modified query and a second modified query based on the query modification description;
(d) out-putting the first modified query to the first search engine and the second modified query to the second search engine;
(e) receiving a first ordered result from the first search engine and a second ordered result from the second search engine generated based on the first modified query and the second modified query;
(f) combining the first ordered result and the second ordered result based on the associated condition to form combined results;
(g) generating modified results based on the results modification description And the combined results; and
(h) outputting the modified results to fulfill the search query.

11. The method of claim 10, wherein the combining step comprises at least one of concatenating, alternating, or blending the first ordered result and the second ordered result.

12. The method of claim 10, wherein generating the modified query comprises at least one of adding, restricting, removing, promoting, or demoting one or more search terms in the original query to generate the modified query.

13. The method of claim 10, further comprising:
(i) generating label definitions based on the specification of sections.

14. The method of claim 13, wherein generating the modified results comprises:
applying labels to the ordered results received from the search engine based on the label definitions; and
changing the labeled ordered results based on the results modification data to obtain the modified results.

15. The method of claim 14, wherein changing the labeled ordered results comprises restricting or removing certain labeled results to obtain the modified results.

16. The method of claim 14, wherein changing the labeled ordered results comprises promoting or demoting certain labeled results to obtain the modified results.

* * * * *

UNITED STATES PATENT AND TRADEMARK OFFICE
CERTIFICATE OF CORRECTION

| | | |
|---|---|---|
| PATENT NO. | : 7,801,876 B1 | Page 1 of 1 |
| APPLICATION NO. | : 11/972924 | |
| DATED | : September 21, 2010 | |
| INVENTOR(S) | : Riley et al. | |

It is certified that error appears in the above-identified patent and that said Letters Patent is hereby corrected as shown below:

Column 18, Line 23 at Claim 10 after "description" delete "And" and insert --and--

Signed and Sealed this
Fifteenth Day of March, 2011

David J. Kappos
*Director of the United States Patent and Trademark Office*